(12) United States Patent
Satou et al.

(10) Patent No.: US 7,744,504 B2
(45) Date of Patent: Jun. 29, 2010

(54) CONTROL APPARATUS OF VEHICLE

(75) Inventors: Shinya Satou, Hitachinaka (JP); Toshio Hori, Hitachinaka (JP); Mamoru Nemoto, Hitachiota (JP)

(73) Assignee: Hitachi, Ltd., Tokyo (JP)

( * ) Notice: Subject to any disclaimer, the term of this patent is extended or adjusted under 35 U.S.C. 154(b) by 370 days.

(21) Appl. No.: 11/940,467

(22) Filed: Nov. 15, 2007

(65) Prior Publication Data
US 2008/0119328 A1      May 22, 2008

(30) Foreign Application Priority Data
Nov. 16, 2006   (JP)   .............................. 2006-309783

(51) Int. Cl.
*B60W 10/02* (2006.01)
*B60W 10/04* (2006.01)
(52) U.S. Cl. ....................... 477/175; 477/181
(58) Field of Classification Search .................. None
See application file for complete search history.

(56) References Cited

U.S. PATENT DOCUMENTS

| | | | |
|---|---|---|---|
| 4,711,141 A * | 12/1987 | Speranza | 701/60 |
| 4,714,144 A * | 12/1987 | Speranza | 477/84 |
| 4,724,723 A * | 2/1988 | Lockhart et al. | 477/102 |
| 4,766,544 A * | 8/1988 | Kurihara et al. | 701/67 |
| 4,873,637 A * | 10/1989 | Braun | 701/67 |
| 5,184,301 A * | 2/1993 | Stasell | 701/110 |
| 5,207,198 A * | 5/1993 | Eisele | 123/357 |
| 5,529,548 A * | 6/1996 | Mack | 477/84 |
| 6,033,341 A * | 3/2000 | Yamamoto et al. | 477/181 |
| 6,071,211 A * | 6/2000 | Liu et al. | 477/175 |
| 6,254,509 B1 * | 7/2001 | Meyer | 477/109 |
| 7,108,634 B2 * | 9/2006 | Kumazawa | 477/176 |
| 7,228,216 B2 * | 6/2007 | Inoue | 701/67 |
| 2003/0100985 A1 * | 5/2003 | Matsumura et al. | 701/55 |

FOREIGN PATENT DOCUMENTS

| | | | |
|---|---|---|---|
| JP | 2001-73840 A | | 3/2001 |
| JP | 2004-263647 A | | 9/2004 |

* cited by examiner

*Primary Examiner*—Dirk Wright
(74) *Attorney, Agent, or Firm*—Crowell & Moring LLP

(57) ABSTRACT

A vehicle control apparatus is provided which can detect a rotating speed drop of an engine generated together with a clutch connection so as to be set to a trigger of a control start. An engine rotating speed at a time of issuing the trigger is set to a target rotating speed, and a rotating speed feedback control having an engine torque as an operation amount is carried out. An ignition retard and a fuel cut are provided as an operator for engine torque in addition to an intake air amount operation by an electronically controlled throttle.

7 Claims, 10 Drawing Sheets

CONTROL APPARATUS OF VEHICLE

BACKGROUND OF THE INVENTION

1. Field of the Invention

The present invention relates to a control apparatus of a vehicle mounting an engine thereon.

2. Description of Related Art

In the case that a driver performs a rough starting operation (clutch operation or accelerator pedal operation) at a time of starting in a manual transmission loaded vehicle (hereinafter, refer to as an MT vehicle), there is a case that an extreme drop of an engine rotating speed or an engine stall is generated. This is because the engine rotating speed is lowered if a clutch torque (corresponding to a load torque in the case of viewing from the engine side) in accordance that a connection of the clutch is advanced, and a clutch torque begins to get over a shaft torque of the engine. Accordingly, in order to inhibit the engine rotating speed from being lowered at a time of connecting the clutch, it is necessary for the driver to further step on an accelerator pedal at a suitable timing and to adjust an engine torque in such a manner as to overcome the load torque.

This operation can be comparatively easily performed on the basis of a longtime accumulation of experience, for an expert driver, however, it is hard for an inexperienced driver to accurately execute this operation. Accordingly, it is desirable to carry out the engine torque operation mentioned above in a vehicle side for compensating a skill of the driver. However, in a conventional engine control system using a mechanical throttle, since a throttle valve corresponding to a main torque control device works with the accelerator pedal, a freedom of the engine torque control is low, and it is hard to execute the torque operation in the engine side at a time of starting.

On the other hand, in recent years, there comes into practical use an engine control system using an electronically controlled throttle in place of the conventional mechanical throttle. In this system, since a throttle opening degree can be set with respect to an accelerator opening degree, a control freedom of the engine torque is high. Accordingly, in the system using the electronically controlled throttle, there have been laid open several techniques for controlling the torque control of the engine in such a manner as to assist the starting operation of the driver.

For example, in patent document 1 (JP-A-2001-73840), there is described a technique for switching a relation between "accelerator opening degree and throttle opening degree" which is generally set linear to a nonlinear relation. The feature of this technique exists in setting the throttle opening degree to an open side in comparison with the normal time with respect to the accelerator opening degree, near the accelerator opening degree which is normally used for connecting the clutch, in the case of a vehicle speed range in which the starting operation is expected. In accordance with this setting, it is possible to adjust the engine torque for overcoming the load torque at the starting time without the driver deeply stepping the accelerator pedal, and it is possible to lighten the load of the driver.

In the technique described in the patent document 1, an increment of the throttle opening degree is calculated in accordance with a feedforward control having the accelerator opening degree as an input. However, the accelerator operation and the clutch operation of the driver are various at a time of starting the MT vehicle, and the accelerator opening degree range normally used at the starting time and the increasing range of the throttle opening degree do not necessarily coincide for some driver, so that there is a case that the torque assist effect can not be sufficiently obtained.

Further, in the range in which the throttle opening degree is set larger with respect to the accelerator opening degree, since a throttle opening degree change is sensitive with respect to the accelerator operation, there has been generated a problem that it is hard to adjust the engine rotating speed before connecting the clutch, or the engine rotating speed does not rise up linearly at a time of racing.

BRIEF SUMMARY OF THE INVENTION

The present invention is made by taking the problems mentioned above into consideration, and an object of the present invention is to provide a vehicle control apparatus which can achieve a smooth start without generating any engine stall even if general drivers perform a rough starting operation in an MT vehicle, and can execute an engine torque operation having no sense of discomfort with respect to an accelerator operation.

The object mentioned above can be achieved by the following control apparatus of a vehicle. In other words, in accordance with the present invention, there is provided a control apparatus of a vehicle having an engine and a clutch, wherein a target engine rotating speed is determined at a time of connecting the clutch in the vehicle, and a rotating speed feedback control having an engine torque as an operation amount is executed for a term of the clutch connection in such a manner that an engine rotating speed coincides with the target engine rotating speed.

Further, in the control apparatus of the vehicle in accordance with the present invention, it is preferable that a start timing of the rotating speed feedback control is determined on the basis of a predetermined engine rotating speed decreasing rate.

Further, in the control apparatus of the vehicle in accordance with the present invention, it is preferable that a start timing of the rotating speed feedback control is determined on the basis of an ON and OFF switch information of the clutch.

Further, in the control apparatus of the vehicle in accordance with the present invention, it is preferable that a start timing of the rotating speed feedback control is determined on the basis of a clutch stroke information.

Further, in the control apparatus of the vehicle in accordance with the present invention, it is preferable that the target engine rotating speed is computed on the basis of a value storing the engine rotating speed at a time of the rotating speed feedback control.

Further, in the control apparatus of the vehicle in accordance with the present invention, it is preferable that the target engine rotating speed is computed on the basis of an accelerator opening degree information.

Further, in the control apparatus of the vehicle in accordance with the present invention, it is preferable that the engine torque operates any of an electronically controlled throttle, a variable intake valve, a fuel cut and an ignition retard independently or in combination.

Further, in the control apparatus of the vehicle in accordance with the present invention, it is preferable that a maximum operation amount of the engine torque reaches 50% or more of a maximum engine torque at the engine rotating speed, in the rotating speed feedback control.

As mentioned above, it is possible to achieve a just enough torque assist for minimizing a drop of the engine rotating speed at a time of connecting the clutch, by employing the rotating speed feedback control.

Other objects, features and advantages of the invention will become apparent from the following description of the embodiments of the invention taken in conjunction with the accompanying drawings.

DETAILED DESCRIPTION OF THE INVENTION

Figure 1:
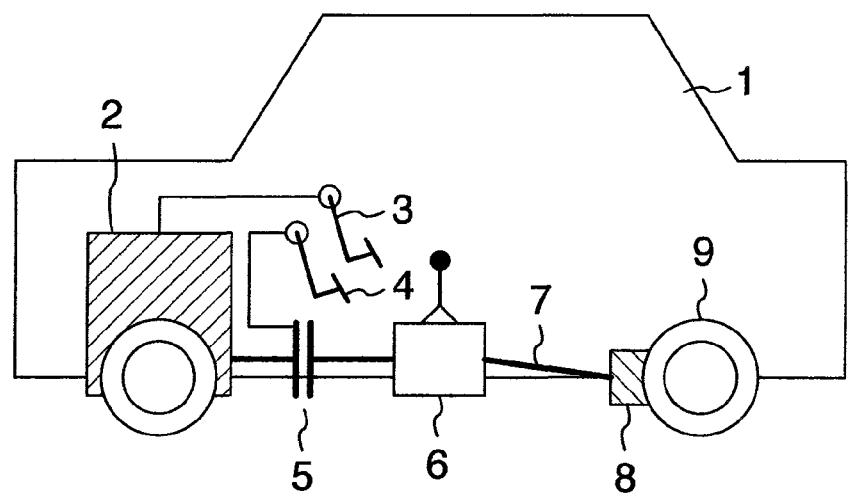
FIG. 1 is a view showing a whole structure of a vehicle.
Figure 2:
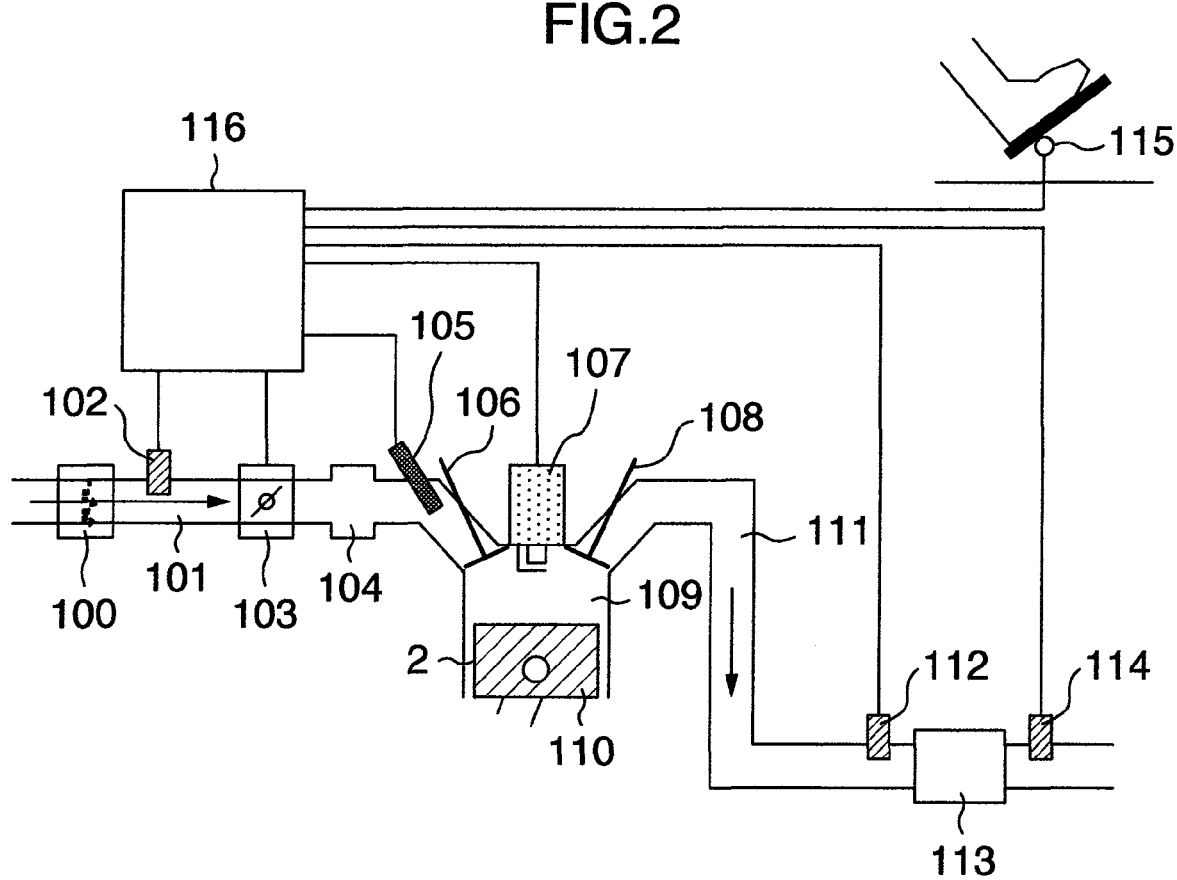
FIG. 2 is a view showing a hard ware structure of a torque base type engine control system.

A description will be first given of a whole structure of a vehicle with reference to FIG. 1. A vehicle 1 is an example of a so-called FR vehicle having a front-engine rear-drive structure, and an engine 2 and a manual transmission 6 are arranged in series in a vertical direction with respect to the vehicle 1. An accelerator pedal 3 and a clutch pedal 4 are installed within the vehicle, and an output of the engine 2 is adjusted on the basis of an accelerator pedal operation by a driver. Further, a dry type clutch 5 is installed between the engine 2 and the manual transmission 6, and a power transmission between the engine and the transmission is adjusted in correspondence to a clutch pedal operation of a driver. A power transmitted to the manual transmission 6 form the engine 2 via the dry type clutch 5 is transmitted to rear wheels 9 via a propeller shaft 7, a differential gear 8 and right and left drive shafts (not shown).

Next, a description will be given of a hard ware structure of the engine 2. On the basis of a pedaling amount of the accelerator pedal 3 operated by the driver, an engine control unit 116 determines a target valve opening degree of an electronically controlled throttle valve 103 (hereinafter, refer to as "electronically controlled throttle"), and transmits an opening degree command value to the electronically controlled throttle 103. If the electronically controlled throttle 103 achieves the target valve opening degree in accordance with the command value, a negative pressure of an intake pipe is generated, and an air is sucked into the intake pipe.

The air sucked from an inlet of the intake pipe passes through an air cleaner 100, and is introduced to an inlet of the electronically controlled throttle 103 after an intake air amount is measured by an air flow sensor 102 provided in the middle of the intake pipe 101. In this case, a measured value of the air flow sensor 102 is transmitted to the engine control unit 116 (hereinafter, refer to as ECU), and such a fuel injection pulse width of an injector 105 that an air fuel ratio comes to a theoretical air fuel ratio is computed on the basis of the value. The intake air passing through the electronically controlled throttle 103 is introduced into an intake manifold after passing through a collector 104, is mixed with a gasoline fuel spray injected by the injector 105 in accordance with the fuel injection pulse width signal so as to form an air-fuel mixture, and is introduced to a cylinder 109 in synchronization with opening and closing of the intake valve 106. Thereafter, the intake valve 106 is closed, and the air-fuel mixture compressed in the process of an ascent of a piston 110 is ignited by an ignition plug 107 near a position just before a top dead center of the compression in accordance with an ignition timing commanded by the ECU, rapidly expands so as to push down the piston 110, and generates an engine torque.

Thereafter, the piston 110 is moved up, an exhaust step is started from a moment when an exhaust valve 108 is opened, and an exhaust gas is discharged to an exhaust manifold 111. A three way catalyst 113 for purifying the exhaust gas is provided in a downstream side of the exhaust manifold 111, and exhaust components HC, CO and NOx are converted into $H_2O$, $CO_2$ and $N_2$ at a time when the exhaust gas passes through the three way catalyst 113. In this case, an extensive air fuel ratio sensor 112 and an O2 sensor 114 are installed in an inlet and an outlet of the three way catalyst, respectively, and each of the air fuel ratio information measured by the sensors is transmitted to the ECU 116. In the ECU 116, there is executed an air fuel ratio feedback control in accordance with a fuel injection amount adjustment, in such a manner that the air fuel ratio comes close to the theoretical air fuel ratio on the basis of the information.

In this case, the command value of the electronically controlled throttle valve opening degree is set on the basis of a target engine torque which is computed within the ECU mentioned below. Further, there is a case that the fuel injection pulse width mentioned above is set to 0 in some cylinder number in correspondence to the target engine torque (a fuel cut). The ignition timing is generally set to MBT (an ignition timing at which the engine torque can be most generated) in the same manner, however, there is a case that it is set to a delay side in correspondence to the target engine torque (an ignition retard).

Figure 3:
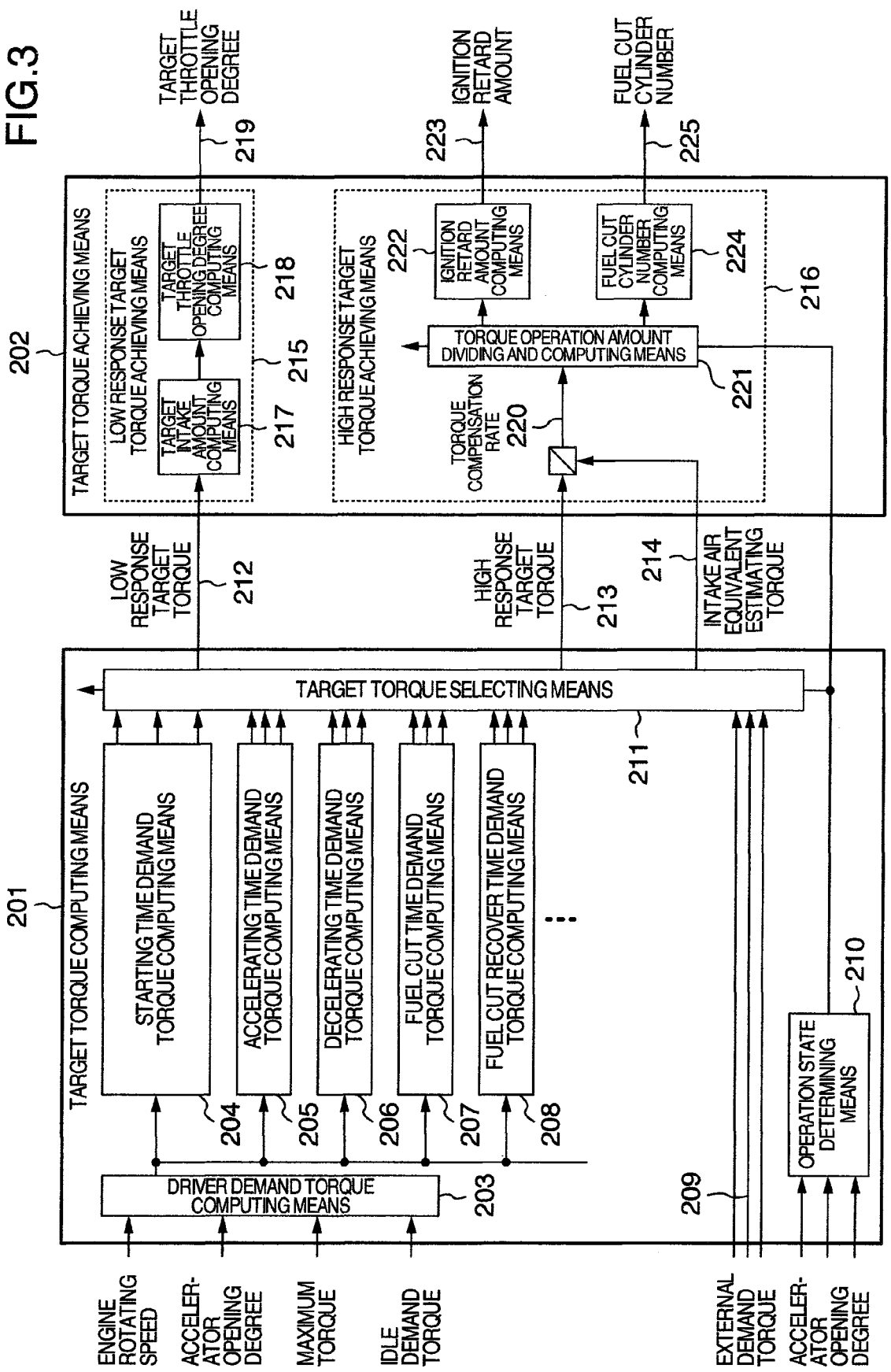
FIG. 3 is a whole control block diagram of the torque base type engine control.

Next, a description will be given of a whole control block of a torque base type engine control corresponding to the engine structure mentioned above with reference to FIG. 3. The present engine control block is mainly constituted by a target torque computing means 201 and a target torque achieving means 202. Within the target engine torque computing means 201, there are installed a driver demand torque computing means 203 for computing a bottommost demand torque in correspondence to the accelerator operation of the driver, and an operation state determining means 210.

Figure 4:
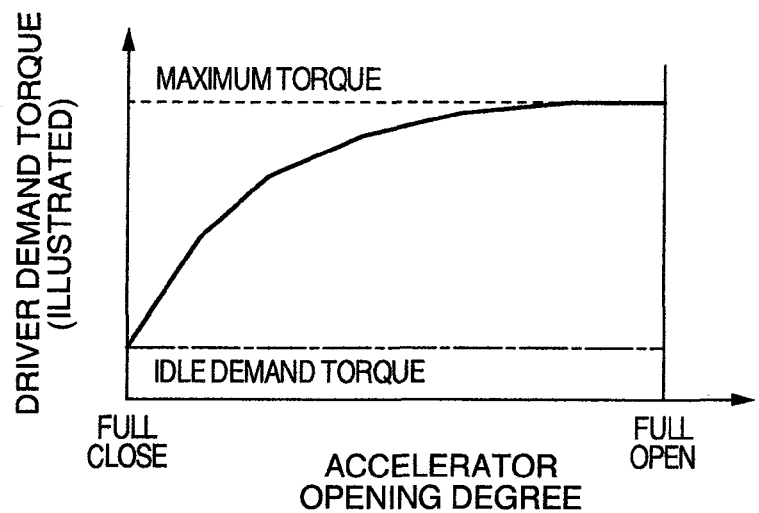
FIG. 4 is a view showing a relation between an accelerator opening degree and a driver demand torque.

The driver demand torque computing means 203 calculates an engine torque demanded by the driver, on the basis of an engine rotating speed, a maximum torque and an idle demand torque in addition to the accelerator opening degree. Specifically, as shown in FIG. 4, a computation of the demand torque is executed, in such a manner as to achieve a torque characteristic which is approximately identical to mechanical throttle+ISC valve system. In other words, the idle demand torque is calculated at a time when the accelerator is fully closed, the demand torque is increased little by little in such a manner as to become convex upward together with an increase of the accelerator opening degree, and the maximum torque at the engine rotating speed is finally calculated at a time when the accelerator is fully opened.

The operation state determining means 210 determines an operation state under the circumstance on the basis of an accelerator opening degree, a vehicle speed, with or without an external demand torque 209 and the like. In a subsequent stage of the drier demand torque computing means 203, there is installed a demand torque computing means group for improving an operation performance at a transition time such as a starting time demand torque, an accelerating time demand torque, a decelerating time demand torque, a fuel cutting time demand torque, a fuel cut revering time demand torque and the like which are computed on the basis of the driver demand torque. In a further subsequent stage thereof, a target torque selecting means 211 is installed, selects an optimum demand torque in the present vehicle from the external demand torques 209 such as the demand torque group, a traction control, a cruise control and the like, in accordance with a result of determination of the operation state determining means 210, and outputs two kinds of target engine torques (a low response target torque 212 and a high response target torque 213), and an intake equivalent estimation torque 214 corresponding to an estimated value of the engine torque at a time of assuming that only the intake control is executed.

Within the target torque achieving means 202, there exist a low response target torque achieving means 215 for achieving a low sped torque control executed by the electronically controlled throttle, and a high response target torque achieving means 216 necessary for achieving a high speed torque control for the ignition retard and the fuel cut. A target intake amount computing means 217 is installed within the low response target torque achieving means 215, and calculates the target intake amount necessary for achieving the low response target torque 212. A target throttle opening degree computing means 218 for achieving the target intake amount is installed in a subsequent stage thereof, and a desired target throttle opening degree 219 is computed and is thereafter transmitted to the electronically controlled throttle 103.

On the other hand, in the high response target torque achieving means 216, a desired torque operation rate is calculated by a torque operation amount split computing means 221 on the basis of a torque compensation rate 220 determined by dividing the high response target torque 213 by the intake equivalent estimation torque 214, and the torque operation rate to be targeted is transmitted to an ignition retard amount computing means 222 and a fuel cut cylinder number computing means 224.

Figure 5:
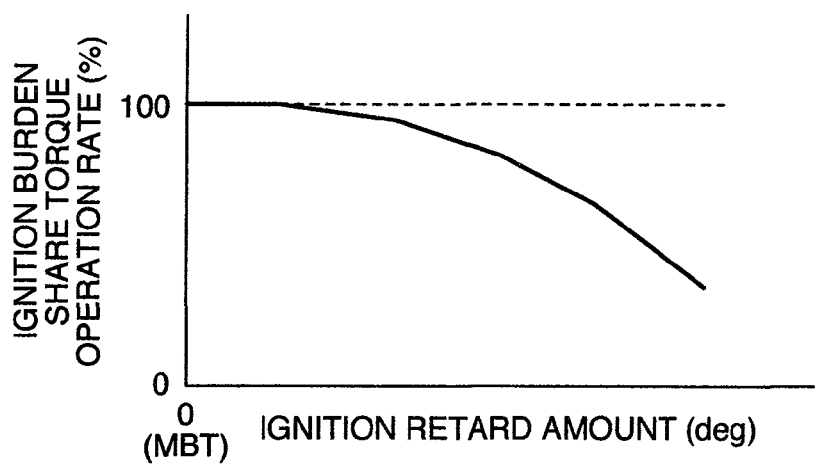
FIG. 5 is a view showing a relation between an ignition retard amount and an ignition burden share torque operation rate.

The ignition retard amount computing means 222 computes an ignition retard amount 223 in correspondence to the transmitted ignition burden share torque operation rate and transmits a result of computation to an ignition timing control computing means. Specifically, an ignition retard amount is calculated in accordance with the ignition burden share torque operation rate on the basis of a characteristic shown in FIG. 5.

Figure 6:
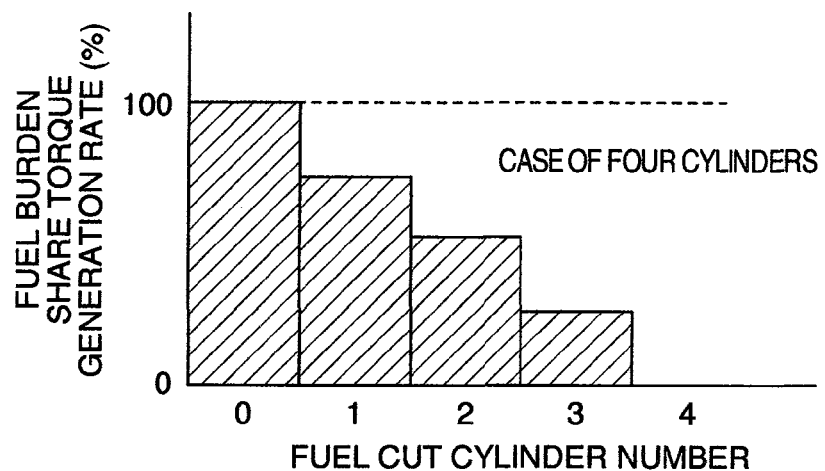
FIG. 6 is a view showing a relation between a fuel cut cylinder number and a fuel burden share torque operation rate.

On the other hand, the fuel cut cylinder number computing means 224 computes a fuel cut cylinder number 225 in correspondence to the transmitted fuel burden share torque operation rate in the same manner, and transmits a result of computation to a fuel injection control computing means. Specifically, the fuel cut cylinder number is calculated in accordance with the fuel burden share torque operation rate on the basis of a characteristic shown in FIG. 6. In this case, the ignition of the torque operation rate and a burden rate to the fuel are determined in correspondence to the operation state determining means 210.

Figure 7:
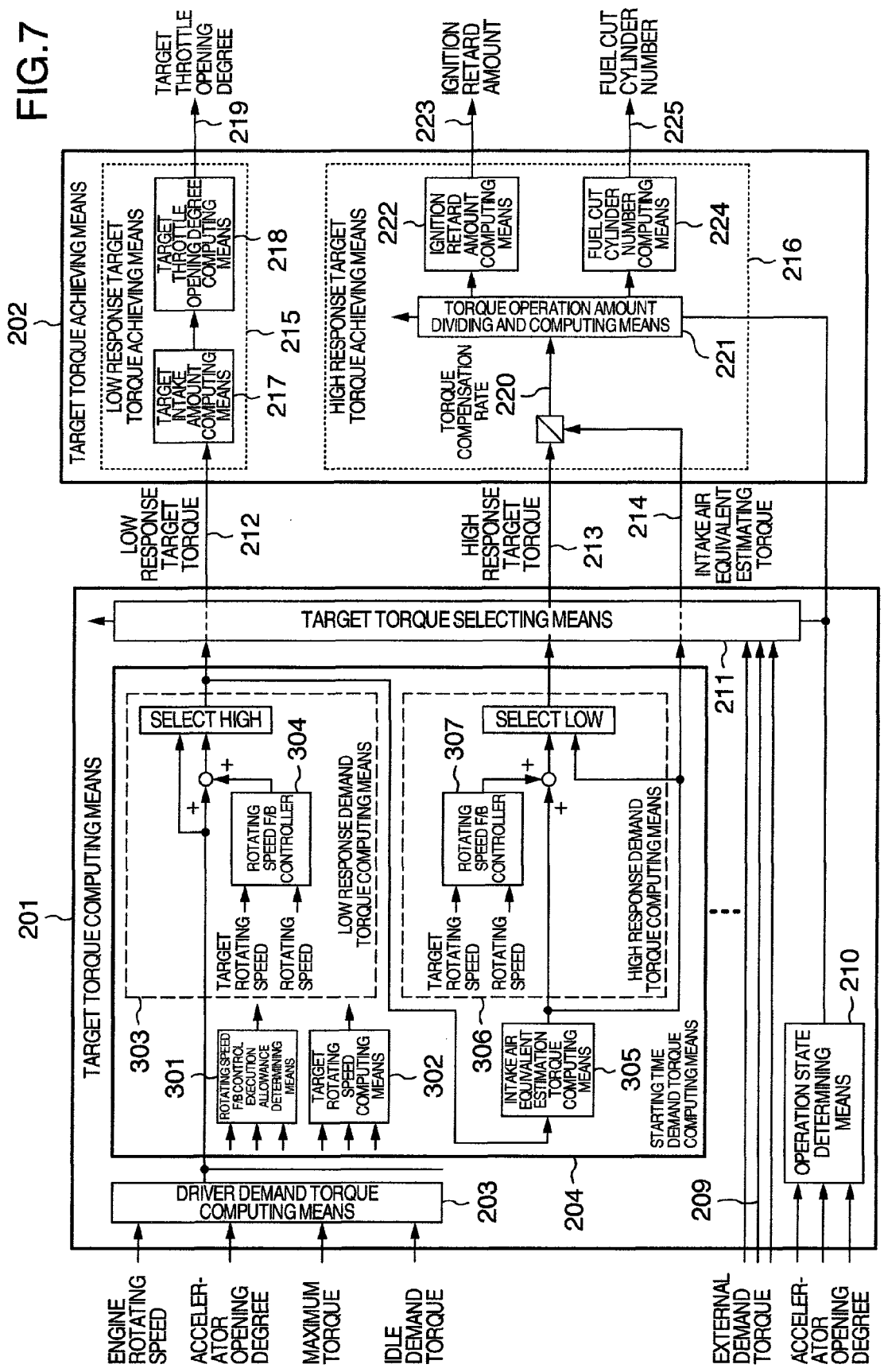
FIG. 7 is a view showing a computing content of a start time demand torque computing means 204, in a first embodiment.

Next, a description will be given of a first embodiment in accordance with the present invention with reference to FIGS. 7 to 10. FIG. 7 shows details of each of parameter computations within the starting time demand torque computing means 204 in the case that the start is determined by the operation state determining means 210, and the starting time demand torque computing means 204 is selected. Main computing means installed within the starting time demand torque computing means 204 are constituted by a rotating speed feedback control execution allowance determining means 301, a target rotating speed computing means 302, a starting time low response demand torque computing means 303, and a starting time high response demand torque computing means 306.

The rotating speed feedback control execution allowance determining means 301 determines whether or not the clutch is under connected, and outputs an execution allowance determination flag of a rotating speed feedback control mentioned below at a time of determining that the clutch is under connected. The target rotating speed computing means 302 calculates a target engine rotating speed suitable for executing the rotating speed feedback control in a state in which the rotating speed feedback control execution allowance determining flag is on.

Further, a computation of a starting time low response demand torque necessary for the low response torque control such as the electronically controlled throttle control and the like is executed within the starting time low response demand torque computing means 303. Specifically, in the case that the rotating speed feedback execution allowance determining flag is in an off state, the driver demand torque is output as the starting time low response demand torque as it is. On the other hand, in the case that the rotating speed feedback control execution allowance determining flag is in an on state, a torque operation amount calculated from a low response demand torque rotating speed feedback controller 304 is added on the basis of the driver demand torque, and is output as the starting time low response demand torque after executing a select high process with the driver demand torque in a subsequent stage. In this case, the low response demand torque rotating speed feedback controller 304 executes a feedback computation as typified by a PID control or the like, on the basis of a difference between the target rotating speed computed by the target rotating speed computing means 302, and an actual rotating speed.

Next, a description will be given of a computation content of an intake equivalent estimation torque computing means and a starting time high response demand torque computing means which are necessary for a high response torque control such as an ignition retard, a fuel cut and the like. The intake equivalent estimation torque is calculated by taking into consideration an operation delay of the electronically controlled throttle and a delay of a charge and a discharge of an intake air caused by an intake pipe volume, and applying a delay process to the starting time low response demand torque, by an intake equivalent estimation torque computing means 305. As a specific delay processing method, the present embodiment carries out needless time+primary delay process on the basis of an actual machine data, however, it is possible to construct a physical model of the electronically controlled throttle and the intake pipe and theoretically calculate the delay by using them.

Next, in the case that the rotating speed feedback control execution allowance determining flag is in the off state, the starting time high response demand torque computing means 306 outputs the intake equivalent estimation torque as the starting time high response demand torque as it is, in the same manner as the starting time low response demand torque computing means 303. On the other hand, in the case that the rotating speed feedback control execution allowance determining flag is in the on state, a torque operation amount calculated from a high response demand torque rotting speed feedback controller 307 is added on the basis of the intake equivalent estimation torque, and is output as a starting time high response demand torque after carrying out a select low process with the intake equivalent estimation torque in a subsequent stage. In this case, the high response demand torque rotating speed feedback controller 307 executes the feedback computation as typified by the PID control or the like on the basis of the difference between the target rotating speed computed by the target rotating speed computing means 302 and the actual rotating speed, in the same manner as the low response demand torque rotating speed feedback controller 304.

Figure 8:
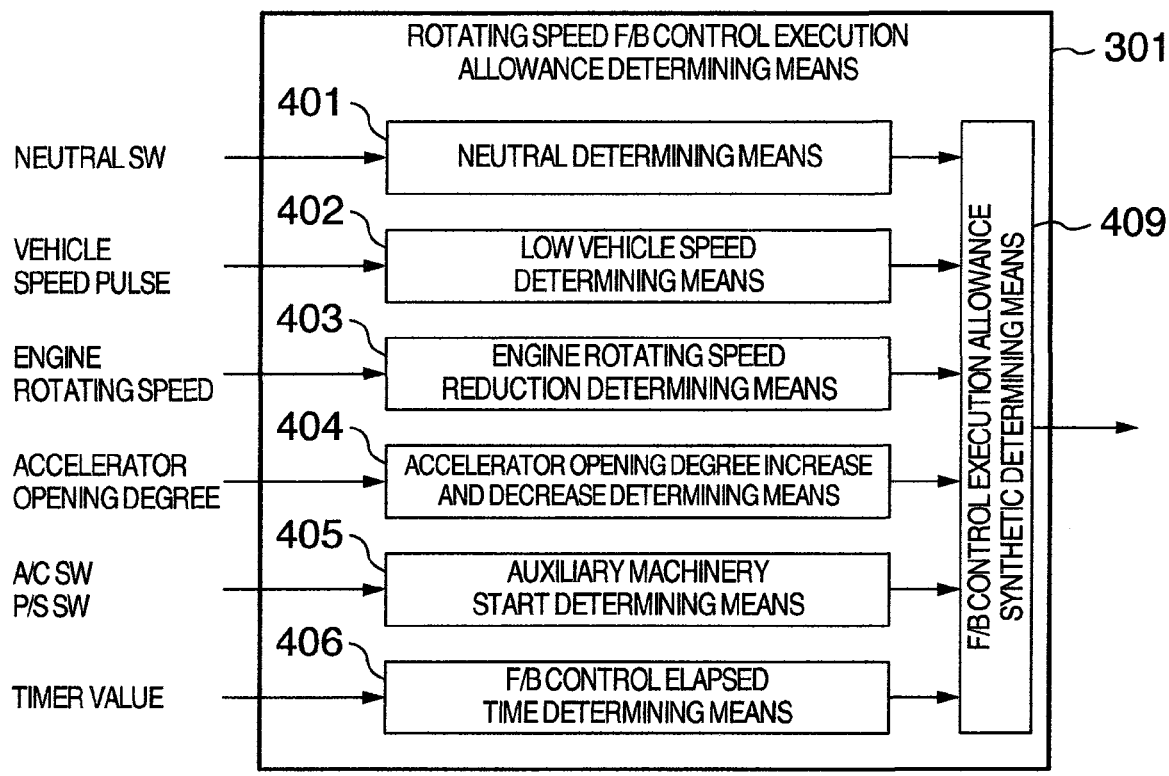
FIG. 8 is a view showing a content of a rotating speed feedback control execution allowance determining means 301, in the first embodiment.

Next, a description will be given of the rotating speed feedback control execution allowable determining means 301 with reference to FIG. 8. An allowance determining flag for the feedback control execution is output into the rotating speed feedback control execution allowance determining means 301 by a feedback control execution allowance synthetic determining means 409, on the basis of a neutral determining means 401, a low vehicle speed determining means 402, an engine rotating speed lowering determining means 403, an accelerator opening degree increase and decrease determining means 404, an auxiliary machinery start determining means 405, a feedback control elapses time determining means 406 and the like. Specifically, in the case that the following determination conditions are simultaneously established, it is determined that the factor of the lowering of the engine rotating speed is based on the increase of the load torque caused by the clutch connecting operation by the driver at a time of starting, and the feedback control execution allowance determining flag is output. Further, in the case that some of the following determination conditions come in failure, the feedback control execution allowance determining flag comes to off in the feedback control execution allowance synthetic determining means 409.

(1) neutral determining flag is on in accordance with a neutral SW information, in the neutral determining means 401

(2) low vehicle speed determining flag is on in accordance with a vehicle speed pulse information, in the low vehicle speed determining means 402

(3) rotating speed lowering amount per unit time gets over a threshold value, and the engine rotating speed lowering determining flag is on, in the engine rotating speed lowering determining means 403

(4) accelerator opening degree increase amount per unit time is more than a threshold value, and the accelerator opening degree lowering flag is off, in the accelerator opening degree increase and decrease determining means 404

(5) auxiliary machinery starting flag is off in accordance with a start information of an air conditioner, a power steering and the like, in the auxiliary machinery start determining means 405

(6) feedback control elapsed time excess determination is off in accordance with a timer information, in the feedback control elapsed time determining means 406

Figure 9:
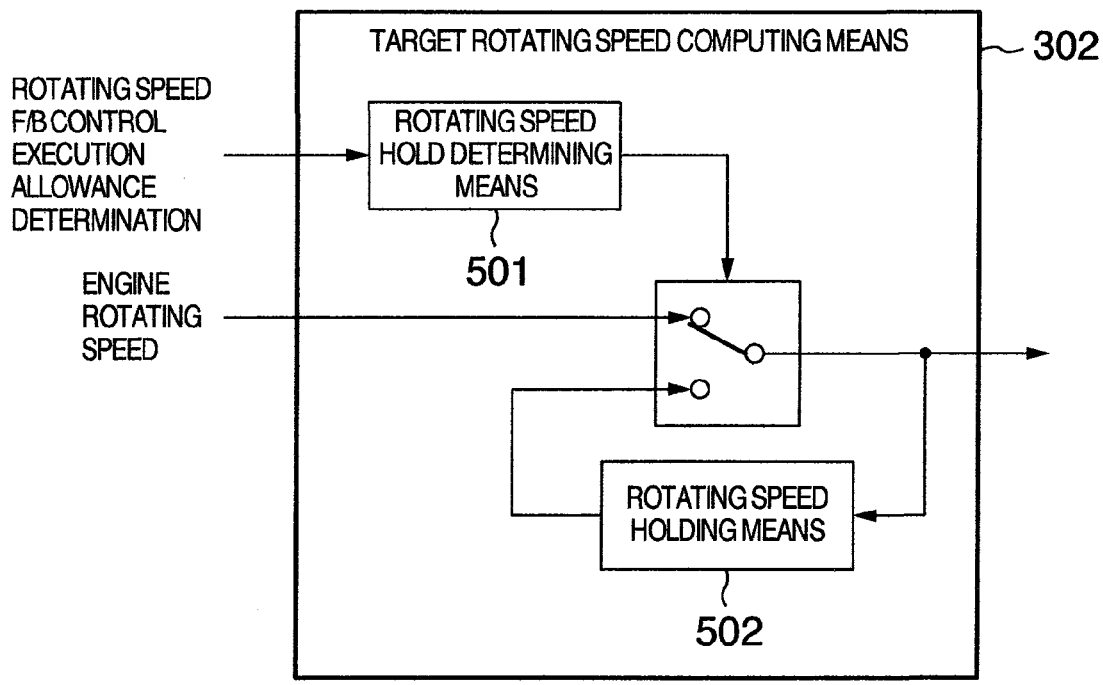
FIG. 9 is a view showing a content of a target rotating speed computing means 302, in the first embodiment.

Next, a description will be given of the target rotating speed computing means 302 with reference to FIG. 9. A target rotating speed hold determining means 501 and a target rotating speed holding means 502 are included in the target rotating speed computing means 302. The target rotating speed hold determining means 501 has the rotating speed feedback control execution allowance determining flag as an input, and turns on a target rotating speed hold determining flag until a canceling condition is input after a time point of detecting a change from off to on of the rotating speed feedback control execution allowance determining flag. Further, the target rotating speed holding means 502 carries out the following computation on the basis of the target rotating speed hold determining flag.

Figure 10:
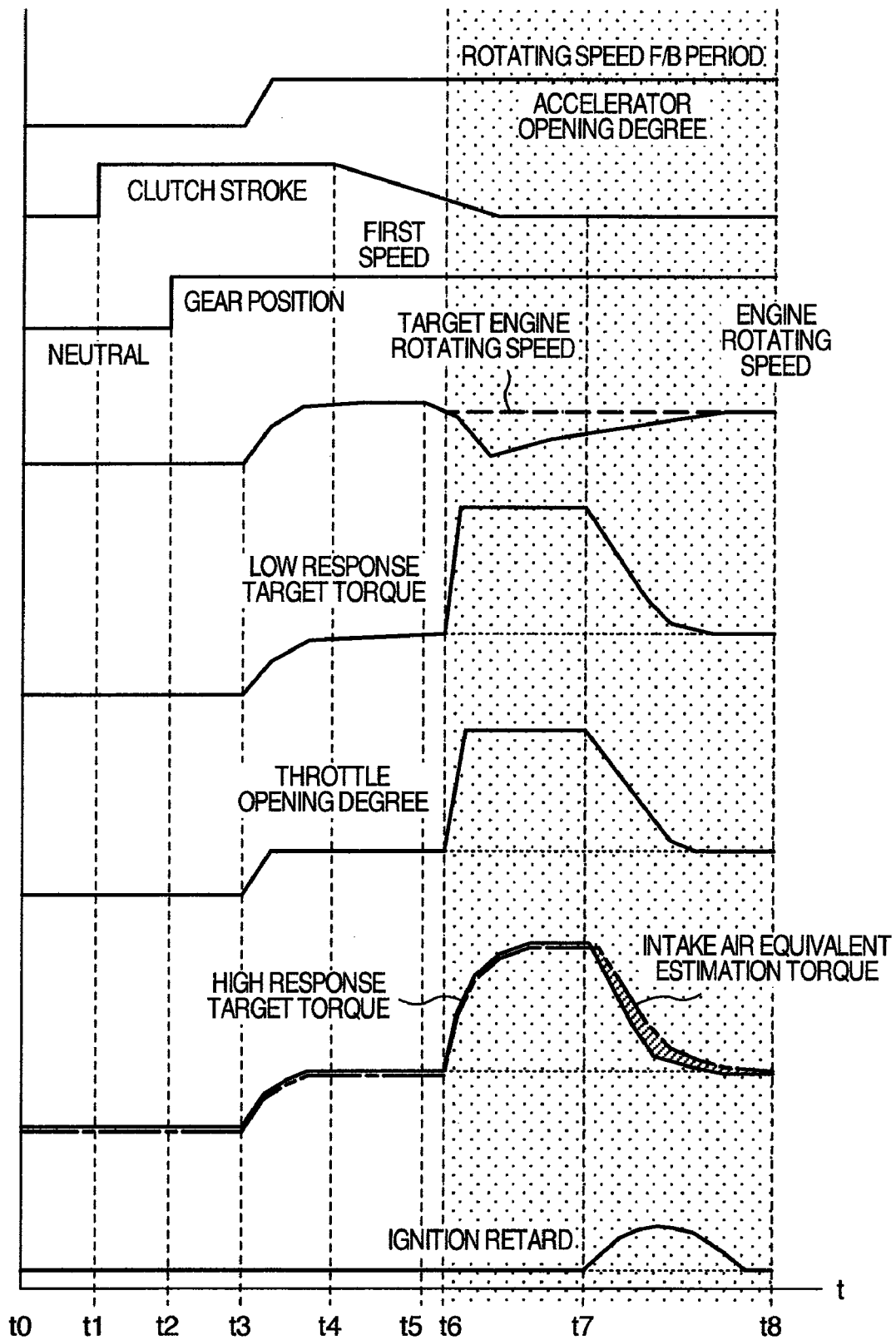
FIG. 10 is a view showing a behavior of each of computation parameters at a time of starting, in the first embodiment.

(1) in the case that the target rotating speed hold determining flag is off, target rotating speed=engine rotating speed (2) in the case that the target rotating speed hold determining flag is on, target rotating speed=target rotating speed at the previous computing time Next, one example of a sequence at a time of the starting motion in the present vehicle system is shown in FIG. 10. At a time t0 (an initial time), the clutch pedal is not stepped down, so that the gear is in a neutral state, and the engine rotating speed is in an idle state. At a time t1, the driver steps down the clutch pedal, and at a time t2, the driver changes the gear from a neutral position to a first speed gear. Next, at a time t3, the driver properly steps down the accelerator pedal, and aligns the engine rotating speed with a rotating speed suitable for the clutch connection. Next, at a time t4, the driver starts returning the clutch pedal, and if the connection of the clutch is started at a time t5, the engine rotating speed starts lowering. In this case, the rotating speed feedback control execution allowance determining means 301 applies a comparison of the threshold value to the lowering amount of the engine rotating speed. In this case, if the rotating speed lowering amount gets over the threshold value, the rotating speed feedback control execution allowance flag comes to the on state at a time t6, and the flag on state is maintained until the rotating speed feedback control execution allowance condition is in failure at a time t7.

In this case, the target rotating speed hold determining means 501 set the target rotating speed hold determining flag in the on state for a period till the time t7, at the same time of detecting the change from off to on of the rotating speed feedback control execution allowance determining flag. Accordingly, the engine rotating speed at the time of the time t6 is output as the target rotating speed, in the target rotating speed computing means 302, in the period between the times t1 and t7.

Further, the rotating speed feedback control for setting the target rotating speed to the target control amount is executed in the period between the times t6 and t7. Specifically, the feedback control is executed by the low response demand torque rotating speed feedback controller 304 within the starting time low response demand torque computing means 303, and the high response demand torque rotating speed feedback controller 307 within the starting time high response demand torque computing means 306, and both of the starting time low response demand torque and the starting time high response demand torque are increased in correspondence to a rotating speed deviation, as shown in FIG. 10. Further, since the throttle opening degree is increased working with the low response demand torque, the engine torque is increased, and it is possible to minimize the lowering of the engine rotating speed caused by the load increase generated by the clutch connection. At this time, the engine torque which is necessary at a time of the feedback control for making a lowering rate of the rotating speed equal to or less than a fixed reference is determined on the basis of a relation between a vehicle weight and a displacement, however, in the case of the vehicle having a small displacement and a comparatively heavy vehicle weight, there is a case that the engine torque reaches 50% or more of the maximum engine torque.

In this case, if the engine rotating speed shifts to increase and the deviation between the engine rotating speed and the target engine rotating speed becomes smaller, both of the low response and high response demand torques are decreased, however, if a difference is generated between the high response demand torque and the intake amount equivalent estimation torque at that time, the high response target torque achieving means 216 is started, and carries out the ignition retard or the fuel cut in such a manner as to cancel the difference. In the normal case, since the difference is comparatively small, the ignition retard is selected as the high response target torque achieving means, and is carried out at a timing as shown in a lower portion of FIG. 10.

Figure 11:
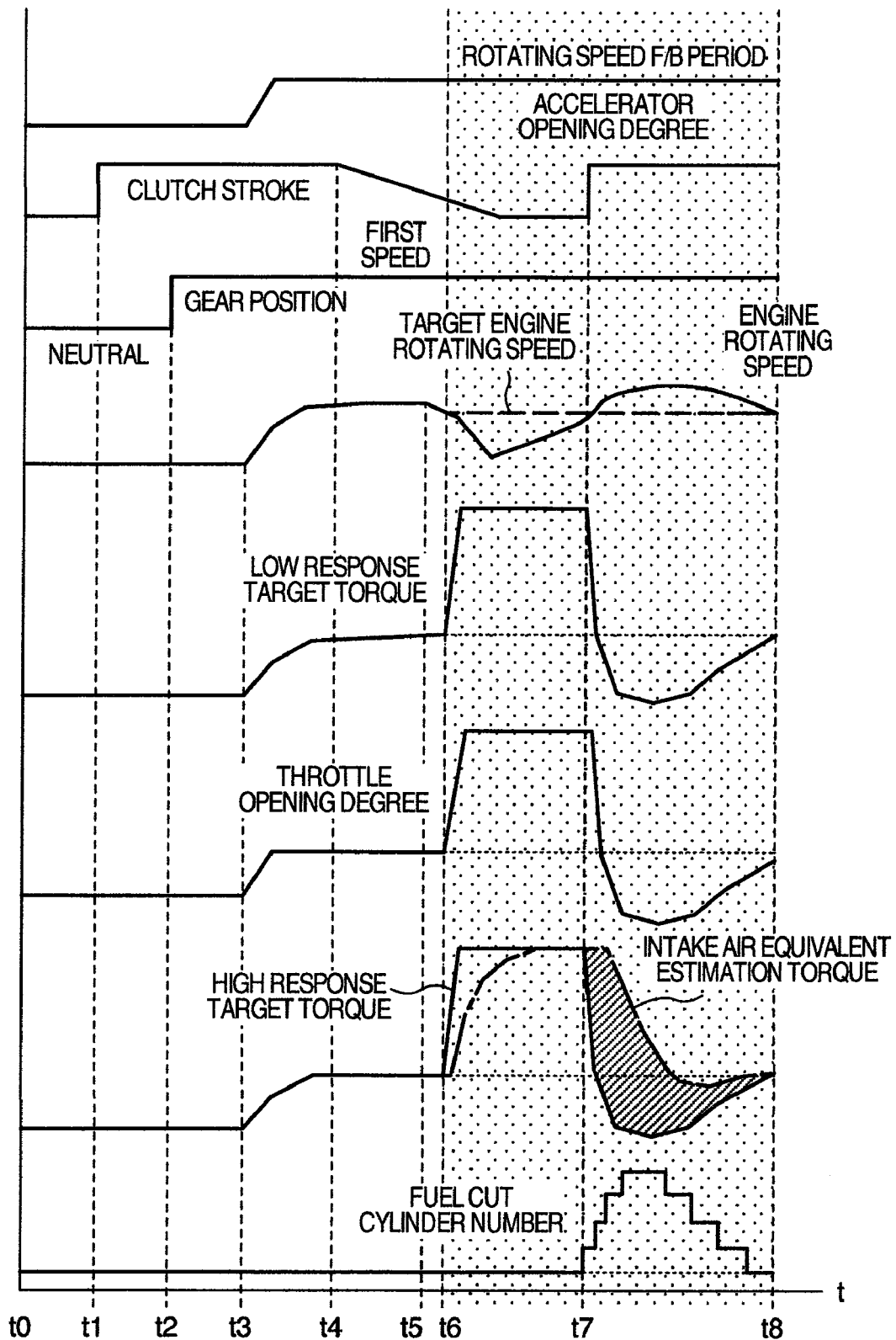
FIG. 11 is a view showing a behavior of each of computation parameters at a time of starting, in a second embodiment.

Next, as a second embodiment, a description will be given of a behavior of each of parameters at a time when the driver cancels the starting operation halfway due to some reason with reference to FIG. 11. The same motions as the first embodiment are carried out from the time t0 to the time t6, however, since the engine load becomes rapidly light if the driver steps down the clutch for canceling the starting operation at a time t7 during the rotating speed feedback executing period, the engine rotating speed starts rising up. If the rotating speed rises up and gets over the target engine rotating speed, both of the low response and high response demand torques are largely lowered on the basis of the operation of the rotating speed feedback control. In the case that the throttle is only closed in accordance with the low response demand torque, the intake amount accumulated in the intake pipe before the time t7 is not immediately canceled, the state in which the actual generated torque is large is kept for a while, and the rise-up is hard to be settled. However, in accordance with the structure of the present invention, the high response demand torque is largely lowered, and if the difference is generated between the high response demand torque and the intake amount equivalent estimation torque in the same manner as the first embodiment, the high response target torque achieving means 216 is started, and carries out the ignition retard or the fuel cut in such a manner as to cancel the difference. In the case of the present case, since the difference is comparatively large, the fuel cut is selected as the high response target torque achieving means, and is carried out at a timing as shown in a lower portion of FIG. 11. Accordingly, it is possible to rapidly down the torque to the high response target torque, and even in the case that the driver cancels the starting operation for some reason, it is possible to minimize the rise-up of the engine rotating speed. In this case, the high response target torque achieving means of the present case is not limited to the fuel cut, but may be constituted by the ignition retard, or a combination of the fuel cut and the ignition retard.

Figure 12:
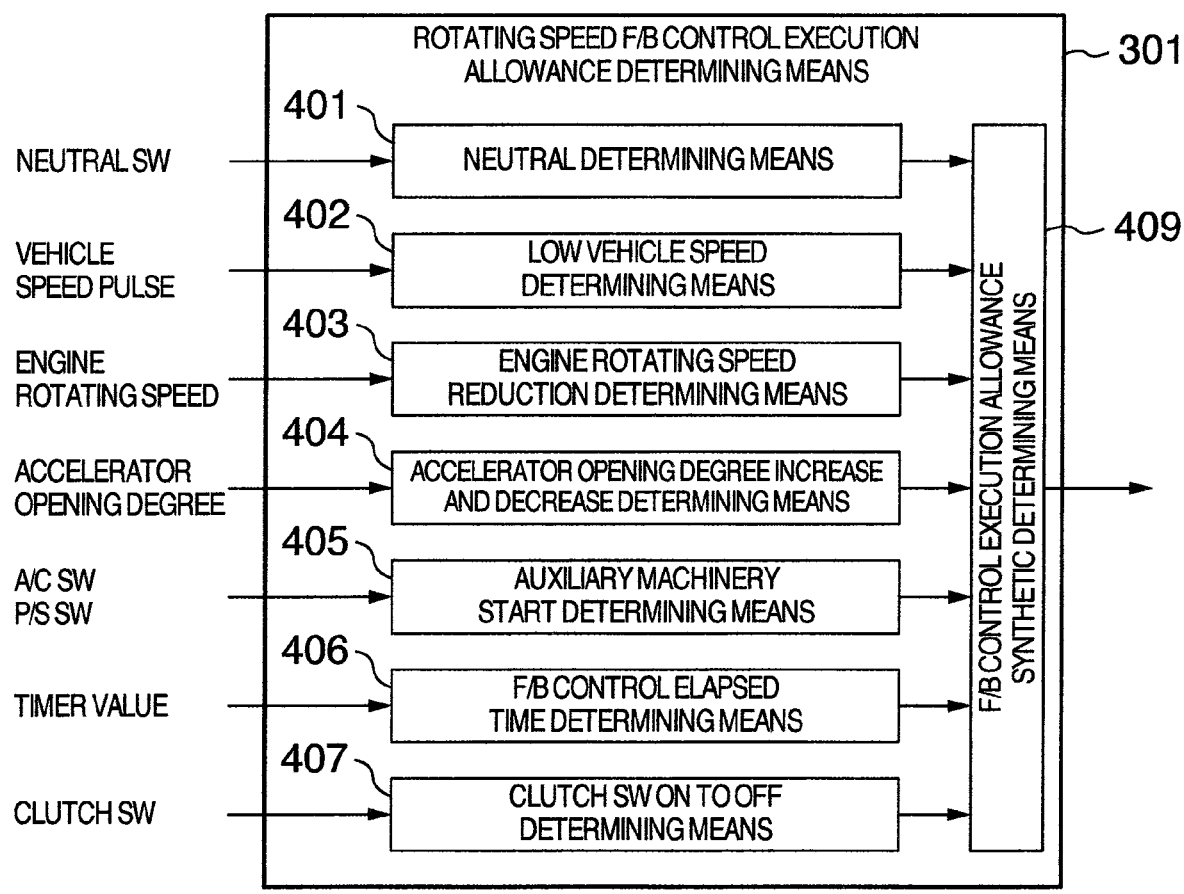
FIG. 12 is a view showing a content of a rotating speed feedback control execution allowance determining means 301, in a third embodiment.

In the embodiments 1 and 2 shown above, since a little rotating speed lowering amount caused by the clutch connection is detected so as to be set as the starting condition of the rotating speed feedback control, a potential of an erroneous determination is high, and a countermeasure for improving a reliability of the starting condition is necessary. Therefore, in accordance with a third embodiment, a clutch SW on to off determining means 407 is added within the rotating speed feedback control execution allowance determining means 301, as shown in FIG. 12. In a partial vehicle, there is installed a clutch SW in which the switch is turned on at a time of stepping down the clutch to the innermost, and it is possible to reduce a probability of the erroneous determination in comparison with the first to second embodiments, for example, by employing a countermeasure for preventing the execution of the rotating speed feedback control from being allowed except a certain fixed period after the clutch switch on to off change is established.

Figure 13:
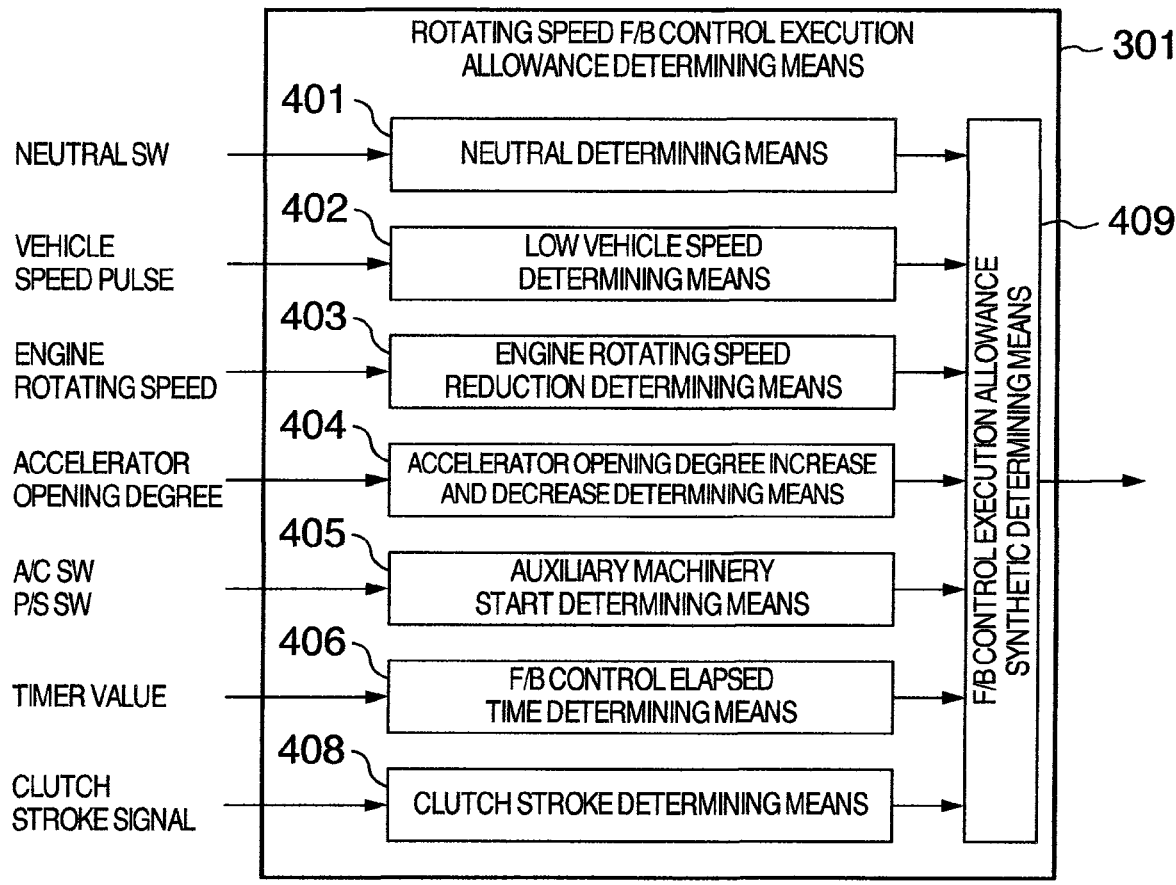
FIG. 13 is a view showing a content of a rotating speed feedback control execution allowance determining means 301, in a fourth embodiment.

Further, in accordance with a fourth embodiment, a clutch stroke determining means 408 is added within the rotating speed feedback control execution allowance determining means 301, as shown in FIG. 13. Since the clutch stroke position at a time of starting the clutch connection is defined within a certain range, it is possible to further reduce the probability of the erroneous determination in comparison with the first to third embodiments, by adding a logic of allowing the execution of the rotating speed feedback control or the like only in the case that the clutch stroke position reaches near the defined range.

Figure 14:
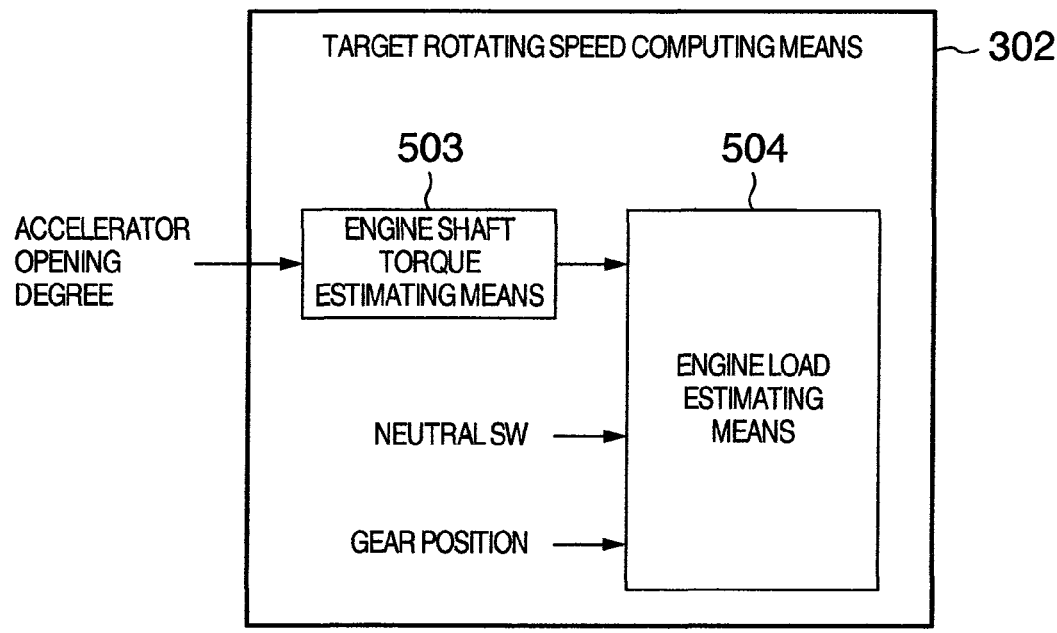
FIG. 14 is a view showing a content of a target rotating speed computing means 302, in a fifth embodiment.

Further, in the embodiments 1 to 4, the engine rotating speed at a time of the rotating speed feedback control execution allowance determination is stored so as to be set to the target rotating speed, however, in accordance with a fifth embodiment, an engine shaft torque estimating means 503 and an engine load estimating means 504 are provided within the target rotating speed computing means 302, as shown in FIG. 14, and the target engine rotating speed is computed beginning at the accelerator opening degree. In this case, the engine load estimating means 504 computes an engine load corresponding to a flywheel before the clutch connection and during the clutch connected period, and computes the engine load corresponding to the flywheel+the vehicle, on the basis of the information of the neutral SW, the gear position and the like.

Figure 15:
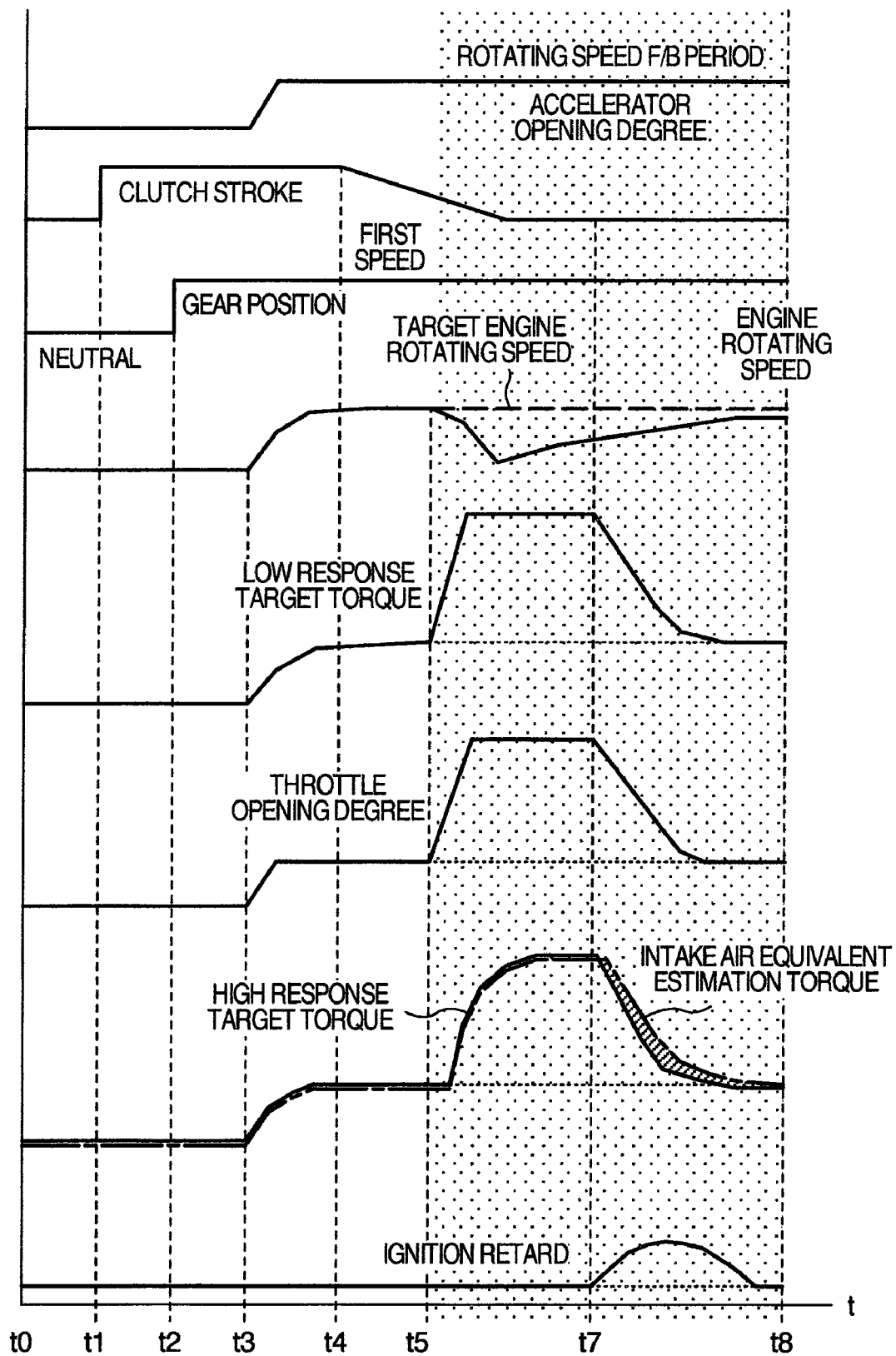
FIG. 15 is a view showing a behavior of each of computation parameters at a time of starting, in the fifth embodiment.

Next, a description will be given of a behavior of each of the parameters at a time of starting in the present embodiment, with reference to FIG. 15. Since the target engine rotating speed before the clutch connection and during the connected period calculates the engine rotating speed in correspondence to the accelerator opening degree in the neutral state in accordance with the computing logic mentioned above, the target engine rotating speed approximately coincides with the engine rotating speed in the neutral state till the time t5. After the time t5 at which the clutch connection is started, a deviation begins to be generated between the engine rotating speed and the target engine rotating speed, and the rotating speed feedback control is executed in the same manner as the embodiments 1 to 4.

In the fifth embodiment, since the rotating speed feedback control mentioned above is executed from the time point that the deviation is generated between the target engine rotating speed and the engine rotating speed, the fifth embodiment has an advantage that it is not necessary to detect the little rotating speed drop amount caused by the clutch connection such as the embodiments 1 to 4. However, in the case that a computing precision of the engine shaft torque estimating means 503 and the engine load estimating means 504 is defective, the deviation is generated between the target engine rotating speed and the rotating speed even in the period except the clutch connection, and the unnecessary rotating speed feedback control is executed. Accordingly, it is necessary to employ a countermeasure (various learning control or the like) for improving the computing precision of the engine shaft torque estimating means 503 and the engine load estimating means 504.

As mentioned above, in accordance with the present embodiment, the rotating speed drop of the engine generated together with the clutch connection is detected so as to set to a trigger of a control start, and a rotating speed feedback control having the engine torque as an operation amount is executed, while setting the engine rotating speed at a time of issuing the trigger to the target rotating speed. As an operating means for the engine torque, the ignition retard and the fuel cut are employed in addition to the intake air amount operation by the electronically controlled throttle.

The engine rotating speed is going to be lowered with respect to the target engine rotating speed, in accordance that the clutch connection is advanced, however, the generation torque of the engine is increased by operating the electronically controlled throttle to the open side in accordance with the feedback control at that time. On the other hand, since the load torque of the engine is rapidly reduced in the case that the driver again steps down the clutch so as to stop the starting operation during the rotating speed feedback control executing period at a time of the clutch connection, the engine rotating speed tends to rapidly rise up. At this time, the electronically controlled throttle is closed in accordance with the feedback control in such a manner as to inhibit the increase of the rotating speed so as to coincide with the target rotating speed. Further, since a blow short is generated by the intake pipe filling content at a time of increasing the intake air amount, only by the present operation, a rapid torque down operation is executed using the ignition retard and the fuel cut together.

The present MT vehicle associated starting time engine torque control can be achieved in the conventional engine control using the electronically controlled throttle, however, it is desirable that this control is carried out by a torque base (torque demand) type engine control which has been made fit for practical use in recent years. The torque base type engine control corresponds to an engine control of computing the target engine torque on the basis of the accelerator opening degree and the engine rotating speed and executing the throttle control, the fuel control, the ignition control and the like in such a manner as to achieve both of the target engine torque and the target air fuel ratio. In the conventional engine control, it is necessary to directly and individually adjust the torque operating amounts such as the throttle opening degree, the ignition timing and the like at a time of carrying out the torque control mentioned above for the purpose of improving a drivability. The torque base type engine control is naturally provided with a torque generating function of automatically computing the throttle opening degree and the ignition timing in such a manner as to faithfully generate the target engine torque. Accordingly, since it is sufficient to adapt mainly to the computing means for computing the target engine torque, at a time of improving the drivability, an adapting work becomes easy.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A control apparatus of a vehicle having an engine and a clutch, wherein a target engine rotating speed is determined at a time of connecting the clutch in said vehicle, and a rotating speed feedback control having an engine torque as an operation amount is executed for a term of the clutch connection in such a manner that an engine rotating speed coincides with said target engine rotating speed, wherein a start timing of said rotating speed feedback control is determined on the basis of a predetermined engine rotating speed decreasing rate.

2. A control apparatus of a vehicle as claimed in claim 1, wherein a start timing of said rotating speed feedback control is determined on the basis of an ON and OFF switch information of the clutch.

3. A control apparatus of a vehicle as claimed in claim 1, wherein a start timing of said rotating speed feedback control is determined on the basis of a clutch stroke information.

4. A control apparatus of a vehicle as claimed in claim 1, wherein said target engine rotating speed is computed on the basis of a value storing the engine rotating speed at a time of said rotating speed feedback control.

5. A control apparatus of a vehicle as claimed in claim 1, wherein said target engine rotating speed is computed on the basis of an accelerator opening degree information.

6. A control apparatus of a vehicle as claimed in claim 1, wherein said engine torque operates any of an electronically controlled throttle, a variable intake valve, a fuel cut and an ignition retard independently or in combination.

7. A control apparatus of a vehicle as claimed in claim 1, wherein a maximum operation amount of the engine torque reaches 50% or more of a maximum engine torque at the engine rotating speed, in said rotating speed feedback control.

* * * * *